US008400034B2

(12) United States Patent
Verrier et al.

(10) Patent No.: US 8,400,034 B2
(45) Date of Patent: Mar. 19, 2013

(54) ACOUSTIC ALTERNATOR DELIMITATION

(75) Inventors: Michel Verrier, Essert (FR); Flore Bouichou, Lyons (FR)

(73) Assignee: Alstom Technology Ltd, Baden (CH)

( * ) Notice: Subject to any disclaimer, the term of this patent is extended or adjusted under 35 U.S.C. 154(b) by 614 days.

(21) Appl. No.: 12/641,678

(22) Filed: Dec. 18, 2009

(65) Prior Publication Data

US 2010/0186307 A1      Jul. 29, 2010

(30) Foreign Application Priority Data

Dec. 18, 2008   (EP) ..................................... 08172077

(51) Int. Cl.
*H02K 5/12* (2006.01)
(52) U.S. Cl. .......................................... 310/88; 310/59
(58) Field of Classification Search ................. 310/88, 310/58, 59; 290/52
See application file for complete search history.

(56) References Cited

U.S. PATENT DOCUMENTS

| | | | | |
|---|---|---|---|---|
| 2,217,431 A * | 10/1940 | Baudry | ........................... | 310/55 |
| 2,381,122 A * | 8/1945 | Fechheimer | .................... | 310/61 |
| 2,424,340 A * | 7/1947 | Sterrett | ........................... | 310/55 |
| 3,435,263 A * | 3/1969 | Willyoung | ...................... | 310/61 |
| 4,163,163 A * | 7/1979 | Gurevich et al. | ............... | 310/59 |
| 5,883,448 A * | 3/1999 | Zimmerman | ................... | 310/52 |
| 6,201,323 B1 * | 3/2001 | Semba et al. | ................... | 310/52 |
| 2002/0135383 A1 | 9/2002 | Haeusermann et al. | | |
| 2010/0186307 A1 * | 7/2010 | Verrier et al. | ...................... | 52/27 |
| 2010/0187921 A1 * | 7/2010 | Verrier et al. | ................... | 310/55 |

FOREIGN PATENT DOCUMENTS

| | | | |
|---|---|---|---|
| DE | 2943097 A1 | | 5/1981 |
| EP | 19656486 | * | 9/2008 |
| JP | 07264808 | * | 10/1995 |

OTHER PUBLICATIONS

Machine translation of JP 07264808, Fujimoto et al., "Horizontal Shaft Water Turbine Generator Equipment and Cooling Apparatus for the Equipment", Oct. 13, 1995.*
Goldwag et al., "Station Layout and Design of Major Mechanical Auxiliary Systems Related to the Turbine Generator", IEE Proceedings, vol. 131 Pt. C No. 6, Sep. 1984.*
Joho, Reinhard; "Air-Cooled Turbogenerators Superseding Hydrogen-Cooling Domaine", Electric Machines and Drives Conference, 2001. IEMDC 2001. IEEE International, p. 565-570.*

(Continued)

*Primary Examiner* — Thanh Lam
(74) *Attorney, Agent, or Firm* — Leydig, Voit & Mayer, Ltd.

(57) ABSTRACT

A protective wall system enclosing a danger zone around an alternator includes a front wall disposed at a front end of the wall system; a back wall disposed at a back end of the wall system; and a first side wall and a second side wall connecting the front wall and the back wall, wherein the front and the back wall extend parallel to a longitudinal axis of the alternator, and wherein the front wall, the back wall and the first and second side walls are gas-tight. The wall system further includes a gas-tight bottom; a first casing enclosing a rotor and a stator of the alternator, wherein a service area surrounds the first casing; and at least one air guiding device configured to guide at least one of gas and heat from a bottom part of the alternator to an upper part of the alternator.

13 Claims, 5 Drawing Sheets

OTHER PUBLICATIONS

Mortensen et al., "Some factors in the Mechanical Design of High Speed Turbogenerators", Jan. 1940, transactions of the American Institute of Electrical Engineers, vol. 59, issue 1, p. 51-56.*

European Search Report dated Nov. 10, 2009, which issued during the prosecution of related European Patent Application No. 08172077; 5 pages.

* cited by examiner

ACOUSTIC ALTERNATOR DELIMITATION

Priority is claimed to European Patent Application No. EP 08172077.3, filed Dec. 18, 2008, the entire disclosure of which is incorporated by reference herein.

The present invention concerns an acoustic delimitation of an alternator.

BACKGROUND

The environment around an alternator is exposed to a constant risk of explosion if gaseous hydrogen, which is an extremely flammable substance, is used for cooling. There are many possible sources of hydrogen leakage around an alternator, allowing hydrogen to leak out into the atmosphere, such as leaky spots at the wave guide seals, interfaces and air-tight transitions, as well as drill holes made by man or instrumentation plug-ins, etc. The circumference of the alternator is classified in zone 2 according to the definition of the norm EN 60079-10.

The design of new alternators therefore must be improved as to protection against the risk of explosion.

SUMMARY OF THE INVENTION

An aspect of the present invention is therefore to increase the safety around an alternator for workers.

The present invention solves the above problem by providing a protective wall system enclosing a danger zone around an alternator. Said wall system comprises a front wall at a front end, a back wall at a back end and two side walls connecting the front wall with the back wall. The side walls extend essentially parallel to a longitudinal axis of the alternator. The alternator, which preferably is cooled by hydrogen ($H_2$), has a rotor and a stator and is enclosed by a first casing. A service area surrounds the first casing. In order for the danger zone to be gas-tight, all walls, i.e. the front wall, back wall and side walls are gas-tight. Furthermore, said wall system has a gas-tight bottom. The distance from the first casing to the side walls is at least 1.50 meters. Preferably, the distance between the first casing and each wall is at least 1.50 meters. This distance from the alternator is kept such that the inspections in the danger zone can be comfortably realized and that preferably the evacuation in case of an emergency can be carried out under maximum safety conditions.

Said wall system is provided with means for guiding gas and/or heat from a bottom part of the alternator toward the upper part thereof, such as a ventilation system. The wall system allows the personnel working close to the alternator to be protected from being affected for instance by a possible explosion. In the case of a hydrogen leak, the acoustic wall allows a hydrogen-free zone. By the inclusion of a ventilation system, hydrogen leaking from the bottom part of the alternator is efficiently guided toward the upper part of the alternator. In addition to a protection from gas and/or heat and/or fire, the wall preferably also serves to protect the personnel in the machine hall from the noise caused by the alternator and from its field of current.

In a first preferred embodiment of the present invention, the wall system further comprises a roof, preferably at a distance of at least 1.50 meters from the first casing. Thereby, the walled-in zone can be completely closed, allowing the best acoustic delimitation and hazard protection. If a roof is provided, the enclosed space must be ventilated.

According to a further preferred embodiment, said first casing is flanked by a first cooling compartment at its front end and a second cooling compartment at its back end. Each cooling compartment can be flanked by an axial bearing flange, each bearing flange preferably being provided with a wave guide seal. The back end axial bearing flange can be connected to a turbine arrangement. The front end axial bearing flange preferably is connected to an exciter, said exciter preferably being enclosed in a second casing. A ventilation device can be attached to the first casing, said first casing preferably comprising at least one ventilation channel.

It can be of additional advantage if at least one air inlet is provided at the bottom of the wall system under the ground level beneath the first casing, enabling air to enter into the danger zone from below. Furthermore, it is of advantage if at least one air guiding device is provided beneath the alternator casing, said air guiding device preferably being able to receive air from a cooling compartment and to guide the air into the alternator casing through at least one air duct. The wall system for instance can comprise air guiding plates permeable to air at the bottom periphery of the wall system below the first casing. The ventilation system is further improved if at least one fan is provided in an area enclosed by the wall system.

A next preferred embodiment is characterized in that a barrier wall arranged perpendicular to the longitudinal axis of the alternator and parallel to the front wall and the back wall is located between the front wall and the back wall. Said barrier wall preferably is located in the area of the exciter. The barrier wall preferably is or has an automatic sliding door. Said additional barrier wall divides the area enclosed by the wall system into two main chambers, of which the chamber between the front wall and the barrier wall can be an annular space, providing an additional safety room for personnel. According to another preferred embodiment, the wall system further encloses a control panel for the operation and/or service of the alternator and/or other electrical devices enclosed by the wall system. Said control panel or other instrumentation for control and/or maintenance of the alternator or other machines or devices can be housed e.g. in said annular space.

The wall system advantageously comprises fire-resistant and/or acoustic panels. Acoustic panels preferably are easily removable in case of high maintenance operations. Preferably, the wall panels and pillars on which they are fixed can resist a hydrogen explosion.

It is of further advantage if the wall system, preferably the front wall thereof, can be penetrated through at least one, preferably only one door of access. The door preferably opens in the direction of exit and preferably permits a fast evacuation of the hazardous area in the case of an emergency within. This provides for personnel an easy access to and exit from the danger zone or, if provided, into or out of an additional safety room.

The form of the protective wall system can be optimized according to the size of the zones to be protected. Preferably, the enclosed area is divided into different danger zones, which can be assigned to different danger zone categories according to norm EN 60079-10.

Further embodiments of the present invention are outlined in the dependent claims.

BRIEF DESCRIPTION OF THE DRAWINGS

In the accompanying drawings preferred embodiments of the invention are shown in which.

DETAILED DESCRIPTION

Figure 1:
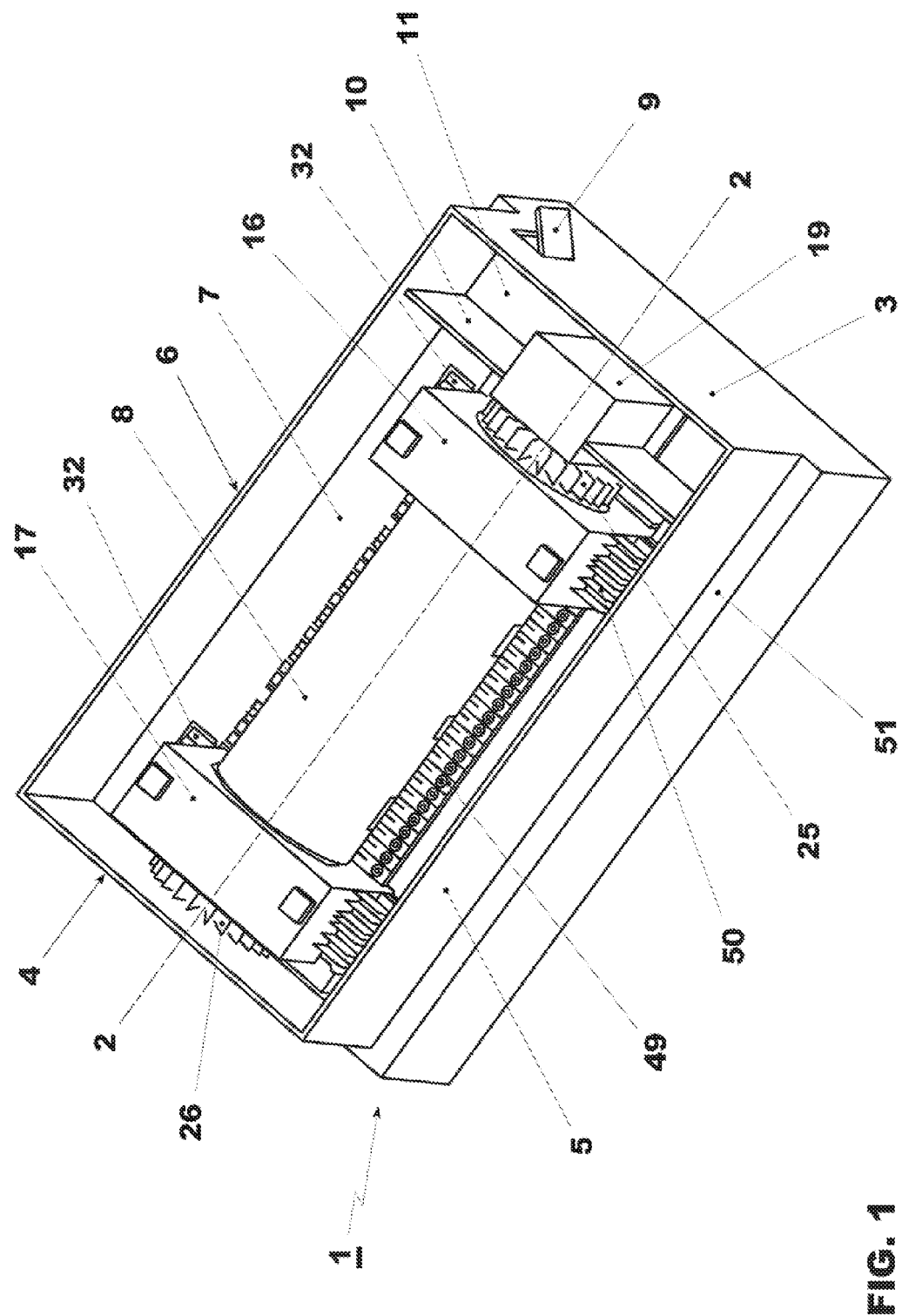
FIG. 1 is a perspective view of a protective wall system for an alternator delimitation.

Referring to the drawings, which are for the purpose of illustrating the present preferred embodiments of the invention and not for the purpose of limiting the same, FIG. 1 shows a protective wall system 1, provided on a base 31 and enclosing an alternator housed by first casing 8, i.e. an alternator casing, and two cooling compartments 16, 17. A service floor 7 is enclosed as well. The wall system 1, which encloses an essentially rectangular floor plan, comprises a first side wall 5 and a second side wall 6, which are connected to each other by a front wall 3 and a back wall 4, and also comprises a bottom. The side walls 5, 6 are arranged essentially parallel to the longitudinal axis 2 of the alternator 35 (see FIG. 3), and the front wall 3 and the back wall 4 are arranged essentially perpendicular to the longitudinal axis 2 of the alternator 35. In the embodiment shown in FIG. 1, a barrier wall 10 is provided between the front wall 3 and the back wall 4, the barrier wall 10 being arranged essentially parallel to the front wall 3 and the back wall 4. In the embodiment of FIG. 1, the barrier wall 10 is arranged in the area of an exciter, housed by a second casing 19. The barrier wall 10 defines an additional chamber, i.e. area 11 within the area enclosed by the wall system 1. The area between the front wall 3 and the barrier wall 10 is an annular space 11, which is partitioned from the danger zone around the alternator 18, i.e. the service area, by the barrier wall 10. Personnel can enter the space 11 through a personnel service door 9, e.g. in order to operate or service a control panel 12, shown in FIG. 5. The alternator casing 8 rests on supporting structures 49 on the service floor 7, while the cooling compartments 16, 17 also rest on supporting structures 50 on the service floor 7. The alternator casing 8 shown has a cylindrical shape, with its longitudinal axis 2 provided essentially parallel to a ground level plane 51 defined by the service floor 7 (see FIG. 4). The cooling compartments 16, 17 are each flanked by an axial bearing 25, 26, the front end axial bearing 25 being located between the first cooling compartment 16 and the front wall 3, and the back end axial bearing 26 being located between the second cooling compartment 17 and the back wall 4. However, between the front end axial bearing 25 and the front wall 3, the exciter 18 for an electric generator is arranged, said exciter 18 having the purpose to generate a rotating magnetic field and being housed in a second casing 19. Gaseous hydrogen, $H_2$, is used for cooling the alternator 35 during its operation. The hydrogen is introduced into the cooling compartments 16, 17 from below.

At the back end of the wall system 1, the alternator 35 is connectable to a turbine, e.g. a gas turbine (not shown).

Figure 2:
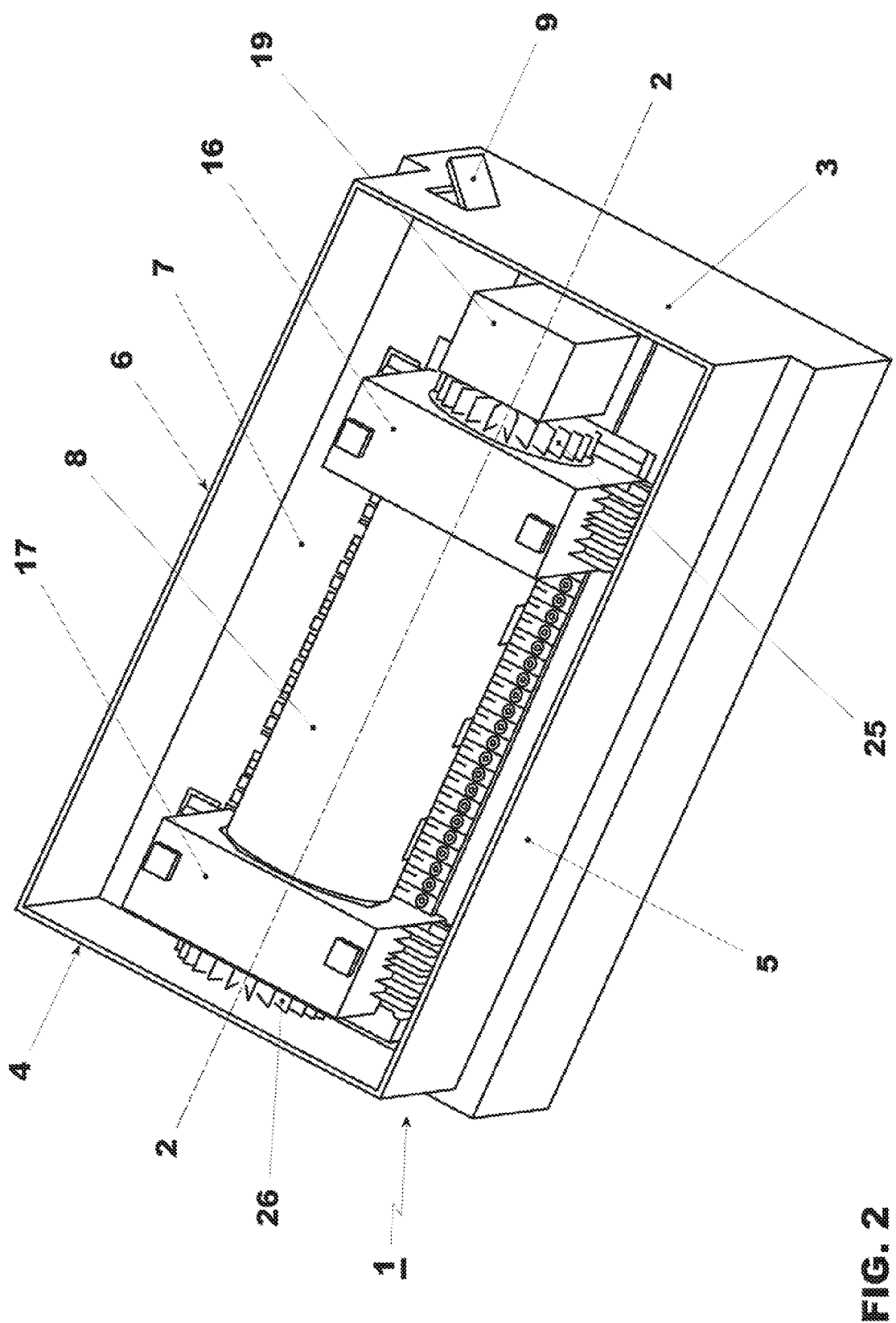
FIG. 2 is a perspective view of a protective wall system for an alternator delimitation according to a second embodiment without a barrier wall.

In the embodiment shown in FIG. 2, no barrier wall 10 is provided between the front wall 3 and the back wall 4. The barrier wall 10 is either not existent in this embodiment, or it is retracted, as for instance if the barrier wall is a sliding door, which can be opened and closed as needed.

Figure 3:
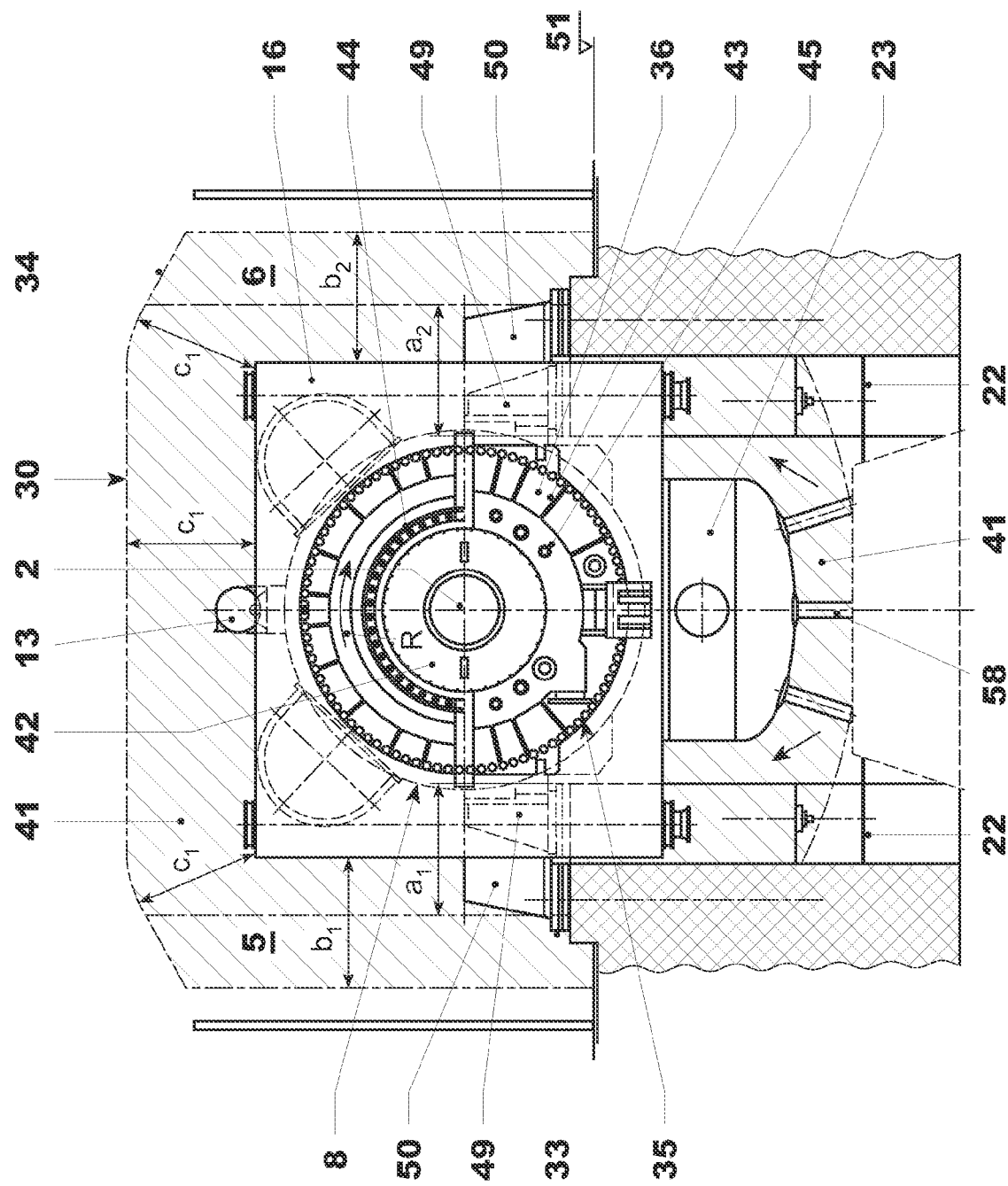
FIG. 3 is a cut along the barrier wall of the protective wall system according to a third embodiment, corresponding to the embodiment of FIG. 1 with a roof.

The cut through the wall system 1 of FIG. 3 provides a view along the longitudinal axis 2 of the alternator 35. The alternator 35 is housed in a first casing 8, which is supported and/or fastened to the service floor 7 by supporting structures 49. Below the service area, in an area let into the ground, an air guiding device 23 is located within an air tank 37. The area arranged below the service floor 7, the service floor being located essentially at the ground level 51, is provided with air guiding plates 22 having air inlets. These plates 22 allow air to be introduced into the danger area (Zone 2) surrounding the alternator casing 8 from below. The air guiding device 23 built on leg stands 58 guides air through ducts 52 into the inside of the alternator 35, as can be seen in FIG. 4.

A tubular formed ventilation device 13 is connected to the top of the first casing 8, and extends essentially parallel to the longitudinal axis 2 of the alternator 35.

The wall system according to FIG. 3 corresponds to the wall system 1 of FIG. 1, however, additionally provided with a roof 30. Said roof 30 has a planar area extending essentially parallel to the plane defined by the service floor 7, as well as two inclined areas 34 flanking said planar area of the roof 30. The distance c1 between the top of the cooling compartments 16, 17 and the roof 30 is at least 1.50 meters.

Figure 4:
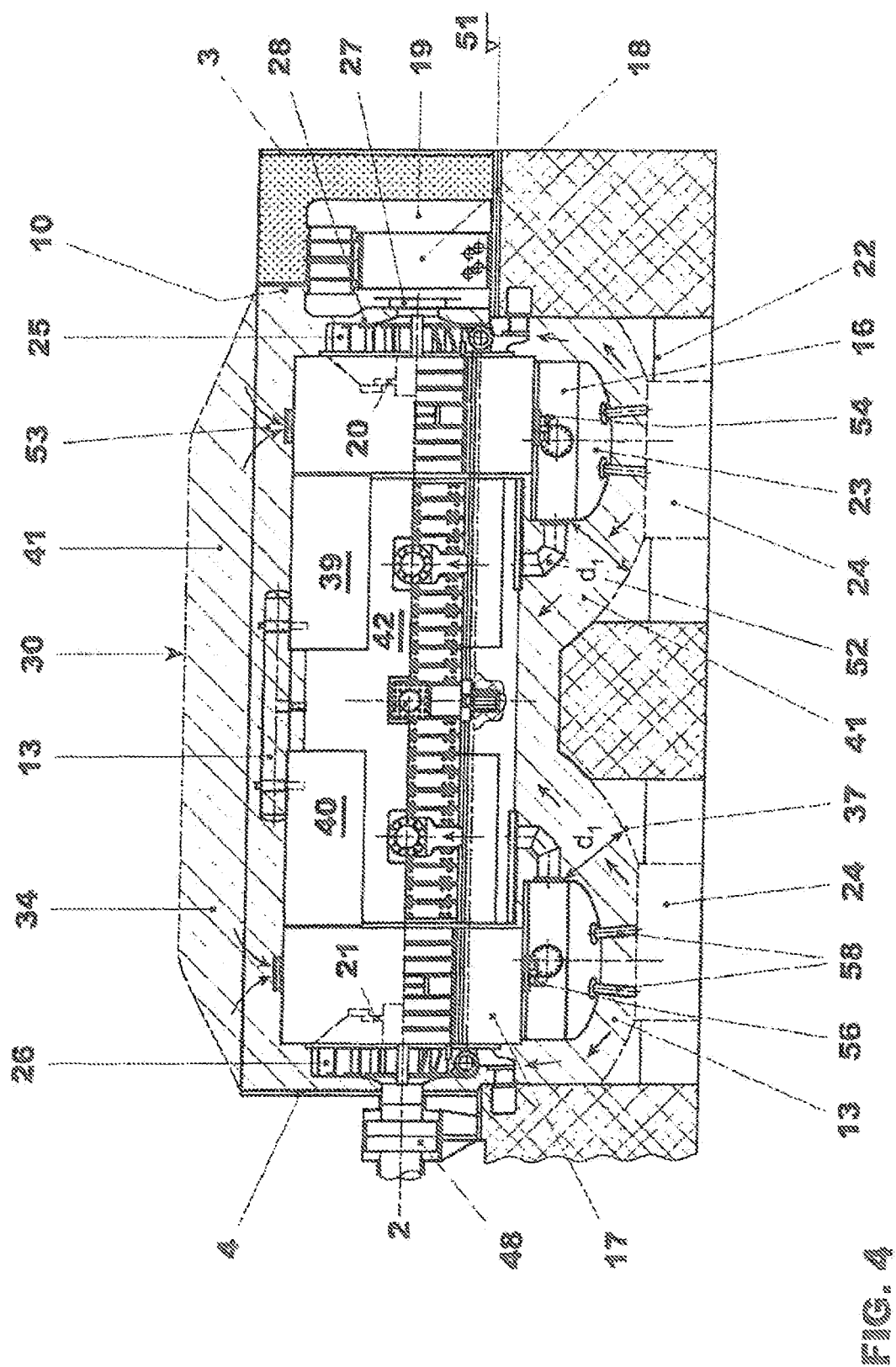
FIG. 4 is a cut through the first side wall of the protective wall system of FIG. 3.
Figure 5:
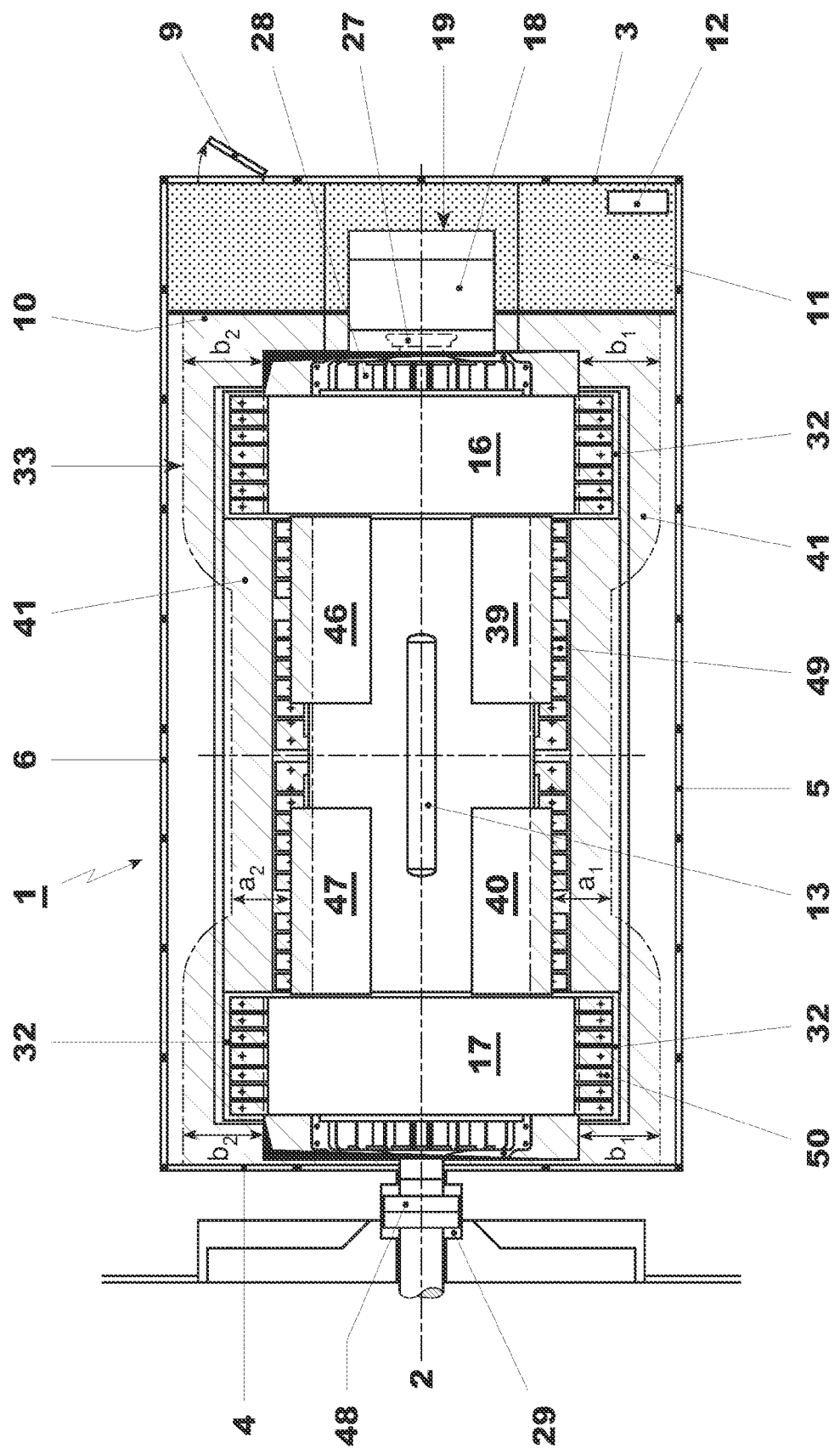
FIG. 5 is a schematic top view of the protective wall system of FIG. 3.

In FIGS. 3-5, the area enclosed by the wall system 1 and marked by slanted lines is defined as "Zone 2", which is defined as the danger zone according to norm EN 60079-10. The wall system 1 according to the present invention encloses said danger zone around the alternator 35, i.e. it's casing 8 and other apparatus provided for the operation and/or cooling of said alternator 35. All electrical apparatus' provided in the danger zone are designed to function and assure a normal level of protection in "Zone 2". A safety distance of at least 1.50 meters is necessary between the alternator and all other electrical equipment not designed for a "Zone 2". Accordingly, the distance a1, a2 between the periphery of the alternator casing 8 and the base of the supporting structures 50 of the cooling compartments 16, 17 is at least 1.50 meters, as is the distance b1, b2 between the first or second side, respectively, of the cooling compartment 16, 17 and periphery of the ventilated area 41. The distance c I between the cooling compartment 16, 17 and the roof 30 is also at least 1.50 meters, as is the distance d1 between the bottom of the air guiding device 23 and the bottom periphery of the air 37, i.e. the bottom periphery of "Zone 2" or the ventilated area 41.

On top of the alternator casing 8 is mounted a ventilation device 13, which has connections to ventilation channels 39, 40. In FIG. 5, four ventilation channels 39, 40, 46, 47 are shown, of which two ventilation channels 39, 46 are provided adjacent to the first cooling compartment 16, while two further ventilation channels 40, 47 are provided adjacent to the second cooling compartment 17. The ventilation channels 39, 40, 46, 47 are arranged such that they extend into the alternator casing 8 and preferably are completely enclosed by the alternator casing 8.

In the far right end of FIG. 4, at the front end of the wall system 1, on ground level 51, the exciter 18 for generating a rotating magnetic field in order to provide a current for the alternator 35 is provided partially within the safety room, i.e. space 11 defined between the front end wall 3 and the barrier wall 10. The roof 30 covers the area enclosed by the barrier wall 10 and the back end wall 4, as well as the two side walls 5, 6. The roof 30 is designed to be domed and thus provides more space for air to circulate within the ventilated area 41. The front end bearing flange 25 is connected to the exciter 18 and is already located within the danger zone. Adjacent to the front end bearing flange 25, the front end cooling compartment 16 is attached, followed along the longitudinal axis 2 by the alternator casing 8 housing the alternator stator 36 and rotor 42. A back end cooling compartment 17 is mounted at the back end of the alternator casing 8, followed along the longitudinal axis 2 by a back end bearing flange 26. Said back end bearing flange 26 is connected over an interface 48 to a turbine, located outside of and therefore no longer enclosed by the wall system 1.

Beneath the alternator casing 8, at least two air guiding devices 23 are located, of which one is located essentially below the first cooling compartment 16 and another one is located below the second cooling compartment 17. Each air guiding device 23 is provided with at least one duct 52, leading from the air guiding device 23 into the alternator casing 8 from below.

Air entering the air tank 37 through the air guiding plates 22 from below is distributed and/or circulated annularly around the alternator casing 8 throughout the danger zone.

Circulating air enters a cooling compartment 16, 17, preferably both cooling compartments 16, 17, through at least one air inlet 53, 55 located at the top of the cooling compartment 16, 17. The air is then cooled in the cooling compartment 16, 17 and exits the cooling compartment 16, 17 through at least one air outlet 54, 56 into air guiding device 23. Here it can be stored and/or conditioned before being guided through at least one air duct 52 directly into the alternator casing 8, and/or into the alternator 35 itself for cooling. Additionally, at least one fan (not shown) can be provided within the ventilated area to promote circulation. The ventilated area 41 around the alternator casing is formed as an annular space 11, allowing the air to circulate around the casing's cylindrical circumferential surface.

LIST OF REFERENCE NUMERALS

1 Protective wall system
2 Longitudinal axis of 35
3 Front wall
4 Back wall
5 First side wall
6 Second side wall
7 Service floor
8 first casing/alternator casing
9 Personnel access door
10 Barrier wall
11 Safety room
12 Control panel
13 Ventilation device
14 Air inlet
15 Air outlet
16 Front end cooling compartment
17 Back end cooling compartment
18 exciter
19 Second casing/exciter casing
20 Front end wave guide seal
21 Back end wave guide seal
22 Air guiding plate
23 Air guiding device
24 Valve box
25 Front end bearing flange
26 Back end bearing flange
27 Detector of exciter
28 Leakage detector
29 Balancer of rotor
30 Roof
31 Base of 1
32 Base of 16, 17
33 Periphery of 41
34 inclined area of 30
35 alternator
36 Stator of 35
37 air tank
38 magnetic axis
39 First ventilation channel
40 Second ventilation channel
41 Ventilated area
42 Rotor of 35
43 Slot of 36
44 First set of coils
45 Second set of coils
46 Third ventilation channel
47 Fourth ventilation channel
48 Interface to turbine
49 Supporting structures of 8
50 Supporting structures of 16/17
51 Ground level
52 Duct from 23 to 35
53 Air inlet into 16
54 Air outlet from 16
55 Air inlet into 17
56 Air outlet from 17
58 Leg stand of 23
a1 distance between 8 and base of 50 facing 5
a2 distance between 8 and base of 50 facing 6
b1 distance between first side of 16/17 and periphery of 41
b2 distance between second side of 16/17 and periphery of 41
c1 distance between top of 16/17 and 30
d1 distance between lower periphery of 23 and lower periphery of 37
R direction of rotation of 36

What is claimed is:

1. A protective wall system enclosing a danger zone around an alternator comprising:
a front wall disposed at a front end of the wall system;
a back wall disposed at a back end of the wall system;
a first side wall and a second side wall connecting the front wall and the back wall, wherein the first side wall and second side wall extend parallel to a longitudinal axis of the alternator, and wherein the front wall, the back wall and the first and second side walls are gas-tight;
a gas-tight bottom;
a first casing enclosing a rotor and a stator of the alternator, wherein a service area surrounds the first casing, and wherein a distance from the first casing to each one of the first and the second side walls is at least 1.50 meters;
a gas guiding device configured to guide at least one of gas and heat from a bottom part of the alternator to an upper part of the alternator;
a first cooling compartment flanking a front end of the first casing and a second cooling compartment flanking a back end of the first casing, the first and second cooling compartments being configured to receive hydrogen circulating in the first casing so as to cool the hydrogen;
a front end axial bearing flange flanking the first cooling compartment and having a front wave guide seal;
a back end axial bearing flange flanking the second cooling compartment and having a back wave guide seal;
a second casing enclosing an exciter, wherein the front end axial bearing flange is connected to the exciter; and
a ventilation device attached to the first casing, wherein the first casing includes at least one ventilation channel.

2. The protective wall system as recited in claim 1, further comprising a roof.

3. The protective wall system as recited in claim 2, wherein the roof is at least 1.50 meters from the casing.

4. The protective wall system as recited in claim 1, further comprising at least one air inlet disposed at the bottom of the wall system under ground level and beneath the first casing so as to enable air to enter into the danger zone from below, at least one air guiding device is disposed beneath the first casing and is configured to receive air from at least one of the first and second cooling compartments, and at least one air duct configured to guide the air into the first casing.

5. The protective wall system as recited in claim 1, further comprising a barrier wall disposed perpendicular to the longitudinal axis, parallel to the front wall and the back wall and between the front wall and the back wall.

6. The protective wall system as recited in claim 5, wherein the barrier wall is disposed in an area of the exciter and includes an automatic sliding door.

7. The protective wall system as recited in claim 1, wherein the walls include at least one of fire resistant and acoustic panels.

8. The protective wall system as recited in claim 1, wherein a distance between the first casing and each of the front wall and the back wall is at least 1.50 meters.

9. The protective wall system as recited in claim 1, wherein the protective, wall system encloses a control panel for the operation and/or service of the alternator and/or other electrical devices enclosed by the wall system.

10. The protective wall system as recited in claim 1, further comprising air guiding plates permeable to air at a bottom periphery of the wall system and below the first casing.

11. The protective wall system as recited in claim 1, wherein the back end axial bearing flange is connected to a turbine arrangement.

12. The protective wall system as recited in claim 1, further comprising at least one fan disposed in an area enclosed by the wall system.

13. The protective wall system as recited in claim 1, further comprising an access door disposed in the front wall.

* * * * *